Sept. 2, 1969 R. L. SNYDER 3,465,306

ORIENTED MAGNETIC MEMORY CORES

Filed June 1, 1964 3 Sheets-Sheet 1

INVENTOR

Richard L. Snyder 3,465,306
Patented Sept. 2, 1969

3,465,306

ORIENTED MAGNETIC MEMORY CORES

Richard L. Snyder, Fullerton, Calif. (4625 Van Kleek Drive, New Smyrna Beach, Fla. 32069)

Filed June 1, 1964, Ser. No. 371,591
Int. Cl. G11c *11/04, 11/14*
U.S. Cl. 340—174 12 Claims

ABSTRACT OF THE DISCLOSURE

Computer memory cores composed of thin magnetic films deposited on linear substrates such as wires or ribbons have uniaxial anisotropy induced by controlling strains to which they are subject and by dividing the magnetic material into regions which restrict the flux paths to the desired directions of orientation. In order to insure that the flux paths in the easy direction are not impeded by scratches, the substrate is polished with strokes in the direction of orientation. The film and substrate are heated to the annealing temperature to remove the variable strains of deposition. The substrate material has a coefficient of thermal expansion which, in combination with that of the film, produces the condition of strain in the latter required for orientation when cooled from the annealing to the operating temperature. Both longitudinal and circumferential strains are controlled.

This invention is concerned with magnetic cores used in memories of digital data handling systems such as in computers and more particularly to the production of cores of deposited magnetic materials.

Numerous memory systems have been described in which bits of information are stored as one of two polarity conditions in discreet magnetic elements or cores formed of thin films of magnetic alloys. These films, deposited chemically, electrochemically, by vapor condensation, gaseous decomposition, or epitaxially are usually of alloys such as permalloy having very low coercivity to enable the cores to be switched by relatively low controlling currents. They are also oriented in the direction of their normal magnetization to provide what is called uniaxial anisotropy. This is done by providing a magnetic field in the direction of the desired orientation during their formation. As will be described, a number of other conditions can exist which also induce orientation. These may relate to direction of mechanical working, direction of strain, the shape of the magnetic body and other factors resulting from various treatments during manufacture. Any and all of these factors have an effect to increase or decrease orientation. In this application, the inducing of orientation is understood to mean the creation of a condition which may either by itself cause orientation or may cooperate with other conditions to increase orientation or to increase the probability that orientation will be produced. The orientation subjects all of the molecular magnets, of which the film is composed, to internal forces, probably electrostatic in nature, which causes them in the absence of externally applied magnetomotive forces and away from poles, to be aligned in the direction of orientation. Magnetic materials so oriented exhibit properties that make them particularly well suited for memory cores. A long thin magnetic body of uniform cross section can be magnetized with all of the molecular magnets polarized in one direction. A central section can have its direction of magnetization reversed by the application of a magnetomotive force from an external source in opposition to the field in the section. The reversed field will remain after removal of the external force if the section is long enough, forming a single magnetic domain. On either side of this domain are two other domains having the polarity of the initial field. At the boundaries between the domains are the domain walls, each composed of two poles of like sign. One domain wall has the north pole of the new domain and the north pole of its neighboring domain. The other domain wall has the south pole of the new domain and the south pole of the neighboring domain. Flux leaves the material at the domain walls or poles and the molecular magnets in these regions are twisted away from their alignment with the direction of orientation. If an externally applied magnetomotive force parallel to the direction of orientation is exerted about a domain wall, the wall will move in the direction to increase the domain magnetized in the direction of the applied field. The magnetomotive force required to cause domain wall motion is considerably less than that required to form a new domain in a uniformly magnetized region. The velocity of domain wall motion varies with the applied field from zero at a critical value termed $H_c$ to a maximum of about 5,000 feet per second at a field slightly less than the domain forming field $H_k$. If, in a uniformly magnetized region an opposing magnetomotive force less than $H_k$, but greater than $H_c$ is applied to a section of uniformly magnetized material parallel to the direction of orientation, the field will be unaffected. If, however, it is applied when a second field $H_t$ parallel to the plane of the film but perpendicular to the direction of orientation is present, switching will occur at a very high speed because all of the molecular magnets will commence to swing around together. This is called rotational or coherent switching. If the fields are applied as brief pulses, the reversing magnetomotive force can be larger than $H_k$ without permanently affecting the field in the absence of the perpendicular force. With the perpendicular force present, coherent switching can occur in periods of time as short as a few nanoseconds.

Manufacturing thin permalloy cores is exceedingly difficult because the uniformity of direction orientation and the coercivity are sensitive to many factors. The character of the substrate, angle of incidence, of deposition in vapor deposition mechanical strains and variations of composition of both the magnetic material and the substrate, all produce first order effects which can and usually do disturb the orientation resulting from the relatively weak influence of the magnetic field applied during deposition. The usual practice is to deposit a large number of cores in a single series of operations on a large flat substrate that is subsequently placed against a planar array of conductors which carry the control and sensing signals. Variations of the properties of the magnetic material and substrate are so great that it is seldom possible to produce a unit having a sufficient number of cores to be economically useful and have all of the areas perform satisfactorily. Variations in the mechanical spacing of the conductors in the array and the currents in the conductors cause changes in the magnetomotive force to which the cores are subject. Any of these variables exerts a critical influence on the performance of the system because the switching, as will be shown below, is a very non-linear function of the applied magnetomotive force and the anisotropy field $H_k$. As a result, advantages which might be expected to accure from producing large numbers of cores assembled in position simultaneously are lost to the very high percentage of rejections.

One important object of the present invention is to provide means for producing thin magnetic film cores in which those factors which may otherwise adversely affect the direction orientation of the magnetic material are controlled in such a way that they aid in maintaining it.

Another important object is to provide a core suitable for switching at high speeds by domain wall motion as well as by rotational switching.

Another object is to provide means of producing cores having sufficiently uniform characteristics that they can be assembled in large numbers to work properly with common circuits.

Another object is to produce cores in a form which provides uniformity of coupling between the cores and the conductors with which they operate.

Still another object is to provide memory cores which can be easily and economically assembled in large arrays.

Another object is to produce cores which have high enough coercivity to be unaffected by normal stray magnetic fields and can, at the same time, be operated with currents which are small enough to be obtained from economical electronic components.

Still another object of this invention is to provide means of making cores in a uniform manner on common substrates in linear arrays so that cores which do not fulfill the requirements can be conveniently removed and continuous lengths of substrates having useful numbers of cores can be retained.

Another object of this invention is to provide an improved method of forming a magnetically oriented core.

These and other objects of the present invention will be apparent from the following specification and the accompanying drawings in which.

Figure 1:
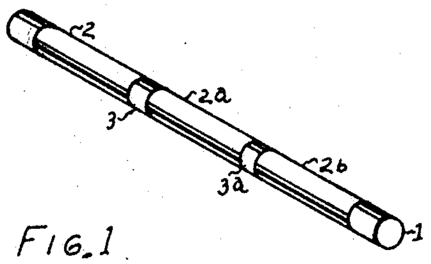
FIGURE 1 is a drawing of a plurality of cylindrical thin magnetic film memory cores deposited on a common solid conducting substrate in accordance with the principles of this invention.

FIGURE 1 shows an assembly of cores, deposited in accordance with the invention, on a common non-magnetic cylindrical substrate 1. For example, each core 2, 2*a*, 2*b* is composed of ferromagnetic alloy having a coefficient of magnetostriction which may be positive or negative but is not zero. Between the cores are regions having non-magnetic material 3, 3*a*, which while not necessary for the sucessful operation of the invention are desirable for reasons to be described below. These spaces may, in some arrangements, be established by the application of rings of stop-off material before deposition of the magnetic material is performed.

Figure 2:
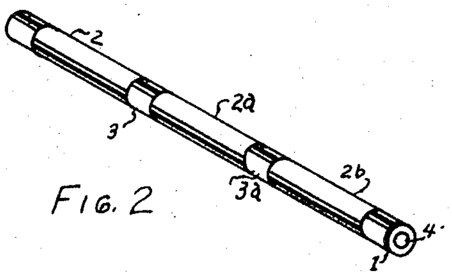
FIGURE 2 shows a plurality of cylindrical thin magnetic film memory cores deposited on a tubular substrate in accordance with the principles of this invention.

The substrate may be hollow as shown in FIGURE 2 to accommodate the passage of a control conductor which may be required in some types of memories. The non-magnetic cylindrical substrate 1 has a central hole 4. The deposited magnetic alloy cores 2, 2*a*, 2*b* may be separated by spaces 3, 3*a* in which there is no magnetic material.

Before proceeding with a description of the means of producing the required properties in the cores and substrates, it may be desirable to discuss the behavior of such cores and the principles upon which their construction is based.

Figure 3:
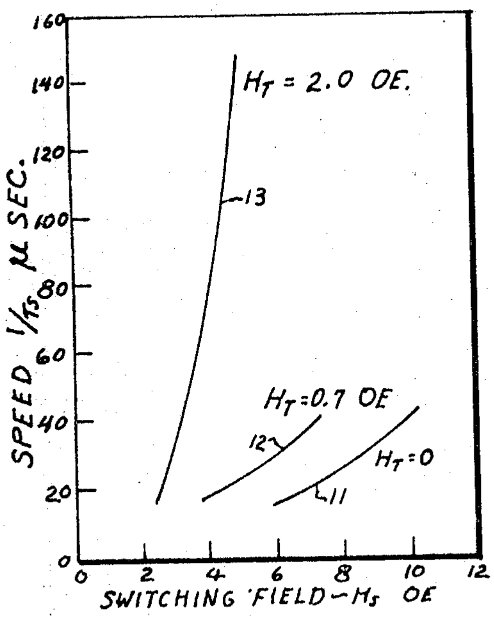
FIGURE 3 is a diagram showing the rotational or coherent switching properties of an oriented thin magnetic film.

FIGURE 3 shows the behavior of a flat oriented thin magnetic film subject to short pulses of magnetomotive force in a direction to reverse the polarity of the existing field. Along the abscissa is plotted the reversing field in oersteds. In the ordinate direction is plotted the switching speed as the reciprocal of time in microseconds. Three curves are shown which were recorded with different values of transverse field $H_t$. The anisotropy field $H_k$ for this particular specimen is 4.5 oersteds. This is the opposing magnetomotive force required to reverse the field in a section of uniformly magnetized material. The coercive force $H_c$, the magnetomotive force required to cause domain wall motion is 1.5 oersteds. The right hand curve 11 shows the switching behavior obtained without a transverse fields $H_t$. In this case, no switching occurs until a magnetomotive force in excess of $H_k$ is exerted and the speed is quite low even with high enough fields to start switching in numerous places in the film. The central curve 12 was recorded with the core being switched in the presence of a transverse field of 0.7 oersted. Switching starts to occur at a switching force of about 4 oersteds, a little less than the anisotropy field $H_k$ and the speed increases more rapidly with increasing switching force. The left hand curve 13 shows the switching characteristic obtained with a transverse field $H_t$ of 2.0 oersteds. Under these conditions, switching can be achieved with little more than 2 oersteds, switching field and the speed increases to a very high value with switching fields of 4.6 oersteds, a little more than $H_k$. It should be noted that the switching speed increases very rapidly with respect to switching magnetomotive force in curve 13.

As mentioned above, thin film cores are usually made of the magnetic alloy, permalloy, which is about 80% nickel and 20% iron. It is usually selected because it has low coercivity so that cores made from it may be controlled by relatively small magnetomotive forces which can be generated by moderate currents in the associated conductors. In addition to its low coercivity, permalloy also has zero magnetostriction. However, to achieve zero magnetostriction, the alloy must have very nearly perfect proportions. The ratio of nickel to iron required to produce zero magnetostriction is not precisely known. A number of investigators have reported ratios ranging from less than 79% to more than 81% nickel with the balance iron. All state that the composition is critical about value reported. Evidently traces of impurities, thermal treatment and mechanical history influence the ratio. If the composition is iron rich, a positive magnetostriction coefficient is observed. If it is nickel rich, negative magnetostriction is observed.

Figure 4:
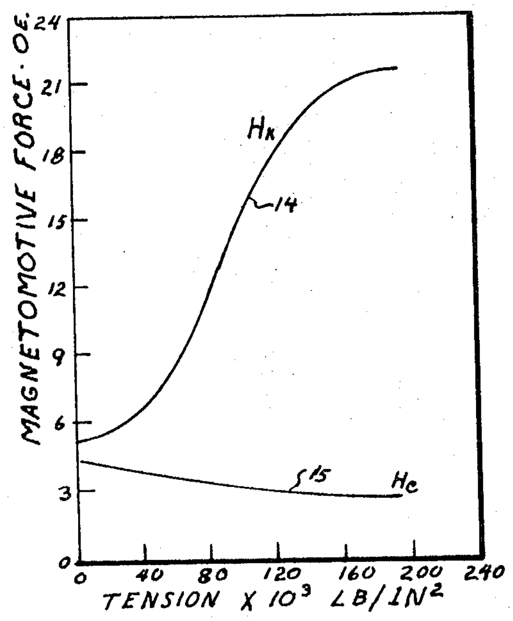
FIGURE 4 is a diagram showing the effect of tension in inducing orientation in a magnetic wire having a positive coefficient of magnetostriction.

When a film having a positive magnetostriction coefficient is deposited on a flat substrate and oriented in a particular direction by the presence of a magnetic field during deposition and annealing, the direction of anisotropy can be changed ninety degrees by subjecting the film to tension perpendicular to the original direction of orientation or by subjecting it to compressive stress parallel to the direction of initial orientation. This is done by subjecting the substrate to bending moments. If the material has a negative coefficient of magnetostriction, the anistropy will be parallel to compressive strain and perpendicular to tensile strain. This bend test is frequently used in the laboratory to obtain quick, rough estimates of the ratio of the constituents of a deposited alloy. It is to be noted that the imposition of strain overrides the effect produced by the magnetic orienting field during deposition. The effects of tension on positive magnetostriction materials is more clearly shown by the curves in FIGURE 4 which show the influence of tension on the magnetic switching characteristics of a 0.001 inch diameter wire having 72% nickel, balance iron plus a fraction of a percent impurities. The upper curve 14 is a plot of the magnetomotive force $H_k$ required to form a domain within a region of opposite polarity as tension is increased. The lower curve 15 is a plot of the minimum magnetomotive force $H_c$ required to cause a domain wall to just start to move. It will be noticed that the switching or neucleating force $H_k$ rises rapidly with tension and becomes a number of times greater than the domain wall moving field. The latter diminishes slightly as the tension increases. It is also to be noted that the wire described is in the hard drawn state. If it had been annealed, the curves would be much the same in shape but have somewhat lower values of field. It is also of interest that when this particular wire is stressed beyond its yield point, it loses its anistropy permanently. The more important observation in this discussion is that strain has a much greater influence producing orientation or anistropy than does a magnetic field during deposition and heat treatment and that it can produce this condition without any magnetic treatment. Attention may also be directed to the fact that there are varying degrees of orientation and that orientation produced by one means may be augmented or enhanced by another means. In this connection, it should be observed that an increase in orientation which may be measured in one sense as the ratio of $H_k/H_c$ requires either a decrease in $H_c$ or an increase in $H_k$ or both. Certainly it may be concluded that films having a high degree of orientation can be expected to have relatively high $H_k$.

A second important consideration in producing thin magnetic films having a high degree of orientation is that the cross section along the magnetic path be uniform so that the field which is near or at the saturation value is not forced to leave the magnetic material and form poles. If the cross section varies in a direction perpendicular to the magnetic orientation and is uniform in the direction parallel thereto, the magnetomotive force required to induce magnetization at right angles to the direction of the orientation is greater than it is when the film is uniform in both directions. Non-uniformity of cross section can be caused by discontinuities in the surface of the substrate which may be in the form of pits and scratches. In general, when the thin films are deposited on a scratched surface, the thickness will vary differently depending on the method used. Electrodeposited surfaces will be heavier at the edge of the scratch than on the sides or bottom. Vapor deposited films will be thinner on the sides. Discontinuities having appreciable influence in this manner can be very small. When it is considered that the film itself may range in thickness from a few hundred to a few thousand angstrom units, it is clear that ordinary polishing that produces finishes measured in a few microinches is not satisfactory. The influence of substrate surface discontinuities is particularly noticeable when the substrate is a fine wire which has minute striations and grooves along its length from irregularities in the dies through which it is drawn. It is difficult, if not impossible, to orient a thin magnetic film deposited on these conventional wires in a circumferential direction despite the fact that such a direction forms a closed magnetic path. Such films do orient parallel to the axis of the wire.

It has been found that well polished substrate surfaces are a prime requirement for the successful deposition of thin magnetic films. However, there are restrictions on the method of polishing of certain substrates. Electropolished surfaces which can be made to have the required degree of smoothness may produce a surface which is composed of large crystal sections. The crystals so exposed may have an orientation in a particular direction resulting from previous mechanical operations. Deposition upon this type of surface can cause the deposit to continue the crystal formation with the result that directional characteristics adverse to those required are imparted to the magnetic material. Mechanical polishing operations detach exceedingly small fragments from crystals and spread or smear them over the surface in a way that causes them to adhere firmly as the parent material. As a result the crystals are covered with an amorphus layer of metal which has only the directional characteristics produced by the motion of polishing. The polishing motion can be made to produce a residual deformation in a direction which will favor the direction of orientation required.

From the foregoing discussion, it becomes clear that a thin film core can be oriented with assurance of success by using a material having a magnetostriction coefficient different from zero, providing it with a mechanical strain in a direction to augment its orientation and placing it on a substrate with an amorphus surface having a minimum of deformation and that in a direction to result in the magnetic material cross section being kept constant everywhere along the magnetic path. All known magnetostrictive materials have a higher coercitivities than permalloy. Therefore, larger controlling or switching magnetmotive forces are required with their use. In order to keep the currents which produce these magnetomotive forces within limits which will enable them to be generated by economical electronic elements, the magnetic paths must be short. This condition is most readily obtained by making the core in the form of a very small diameter ring by depositing it on the circumference of a small diameter wire or tube as illustrated in FIGURES 1 and 2. The current necessary to produce the required field being proportional to the magnetic path is then also proportional to the diameter of the substrate. For example, a field of one oersted can be produced at the surface of a wire 0.001 inch in diameter by a current through the wire of less than 6.5 milliamperes. Substantial reduction in current requirements can be obtained through reducing the coercivity by annealing the magnetic material after deposition.

Figure 5:
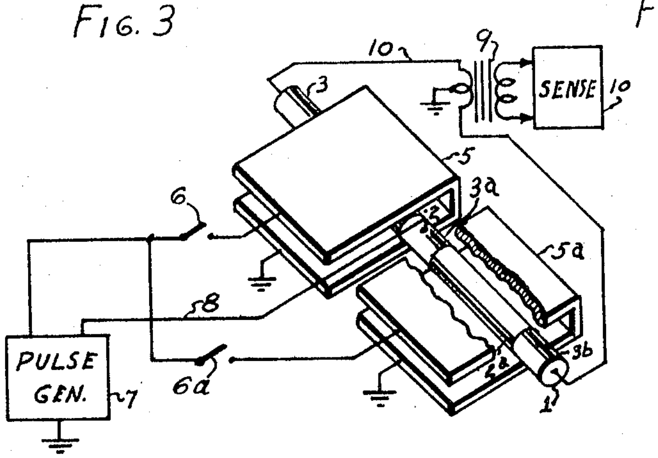
FIGURE 5 shows a method of selectively switching circumferentially oriented cylindrical cores, on a common substrate, made in accordance with the invention, in the rotational or coherent mode.
Figure 6:
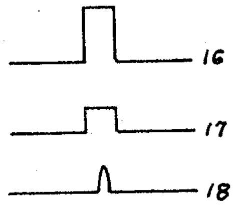
FIGURE 6 shows the signals required to switch a cylindrical core in the coherent mode and the output signal resulting from switching.

Cylindrical circumferentially oriented thin film cores deposited on common substrates can be selectively switched by two methods. FIGURE 5 shows one method which is more fully described in my co-pending application entitled "Cylindrical Thin Film Magnetic Core Memory," Ser. No. 371,593, filed June 1, 1964 and now U.S. Patent No. 3,390,383. In this system, a cylindrical substrate 1 is employed which is shown having two cores 2 and **2*a* separated and bounded by regions having no magnetic material 3, 3*a*, 3*b*. Folded around each core is a conductor 5 and 5*a*. One terminal of each conductor is grounded. The other is connected through switches 6 and 6*a* to one output of a pulse generator 7 which may be a commercially available laboratory unit or may be assembled from standard electronic parts by one skilled in the art. One and only one switch is closed at a time depending on which core is selected to be switched. A second output of the pulse generator 7 is connected to an insulated conductor 8 connected to the midpoint of the substrate 1. The amplitudes of the current pulses from the two outputs of the generator can be separately adjusted. The current delivered to either one of the folded conductors is adjusted to produce a magnetomotive force within the space the conductor encloses and which includes the core, sufficient to serve as a transverse field $H_t$. This field will be parallel to the axis of the core and therefore perpendicular to the direction of field and orientation. The current is conductor 8 divides equally between the sections of the substrate 1 on either side of the midpoint and is adjusted to produce circumferential magnetomotive forces at the surface of the substrate equal to the switching force required. The ends of the substrate 1 are connected to the terminals of the centertapped primary winding of transformer 10. The centertap is grounded to provide a return path for the current in the substrate. The secondary of the transformer 9 is connected to the output device which may be an oscilloscope or a sense amplifier coupled to other digital equipment. Both pulses are preferably of sufficiently short duration that switching in a core not subject to a transverse field cannot occur. This last precautionary measure is recommended because small variations in the core characteristics and switching currents have a large effect on the switching time as illustrated by the curves in FIGURE 3 and it is desirable that the currents be made as large as possible. If this is done, most cores will switch much faster than is required and marginal cores may be switched with the speed specified. The switching of one of the two cores induces a voltage across the substrate that it encircled which, applied to the primary of the transformer 9, induces an output in the secondary. Such an output is indicated at 18 in FIGURE 6. 16 and 17** are the current pulses in the substrate and selected U-shaped conductor respectively. The switching can be very fast, in the order of a nanosecond. It requires quite close control of the core characteristics and of the switching fields.

Figures 7, 8, 9, 10:
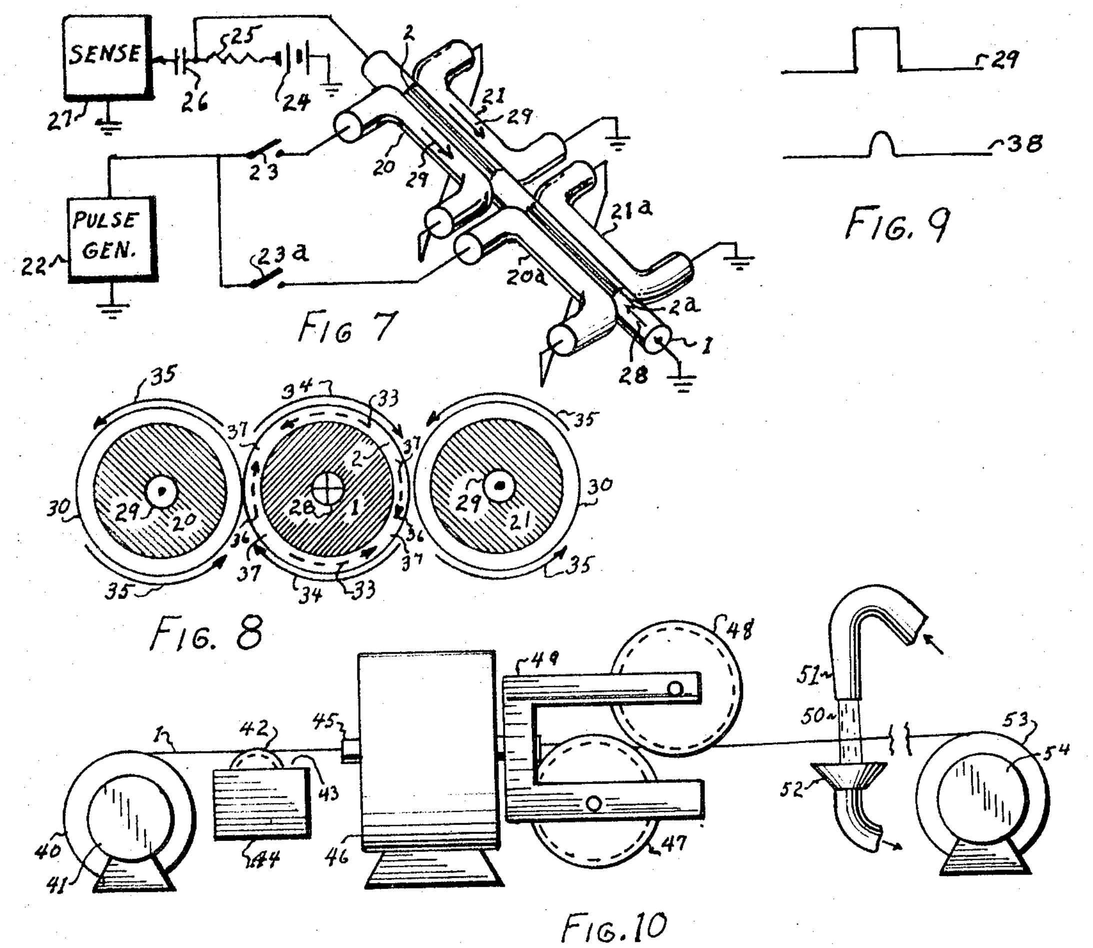
FIGURE 7 shows a method of selectively switching circumferentially oriented cylindrical cores occupying a common substrate made in accordance with this invention, in the domain wall motion mode.
FIGURE 8 shows a cross section of the substrate core and control wires of the system in FIGURE 7 with the directions of the magnetomotive forces indicated by arrows about the various conductors.
FIGURE 9 shows the pulse signal required to initiate domain wall motion switching and the signal generated as a result of such switching.
FIGURE 10 illustrates a mechanism for circumferentially polishing a cylindrical substrate in accordance with the principles of the invention.

The second method of selectively switching circumferentially oriented cores on a common conducting substrate, which is more fully described in my copending application entitled "Memory With Cores Threaded by Single Conductors," Ser. No. 371,592, filed June 1, 1964, is illustrated in FIGURES 7, 8, and 9. In FIGURE 7, the cores 2 and 2*a* may be placed on a solid conducting substrate 1. On either side of each core is placed an insulated conductor 20, 21 and 20*a* and 21*a* shown connected in series to carry equal currents in the same direction. These pairs of conductors are connected to the terminal of a pulse generator 22 through switches 23 and 23*a*. One and only one of these switches is closed at a time. The one that is closed selects the core to be switched. One end of the substrate is grounded, the other is supplied from a source of constant current such as the battery 24 through a resistor 25. The ungrounded terminal of the substrate is also connected through a capacitor 26 to the output sensing system 27. The current through the substrate illustrated by the arrow 28 is adjusted to produce a magnetomotive force approximately equal to $\frac{3}{4}(H_k-H_c)+H_c$. This force will not disturb a field in the opposite direction in the core in the absence of an externally applied force. A current pulse is impressed on one of the pairs of wires on either side of the core in such a way that the current shown by the arrows 29 in the wires flows parallel to, but in the opposite direction from the current in the substrate. The flow of these currents and their resultant magnetic fields is more clearly shown in the cross section drawing of the two insulated wires 20 and 21 positioned on either side of the core 2 and substrate 1 in FIGURE 8. The wire insulation is indicated by the number 30. The thickness of the core 2 is greatly exaggerated in this drawing. The insulation thickness is less exaggerated. Before switching, the core 2 has a continuous magnetic field in the direction indicated by the broken arrows 33 and is subject to a magnetomotive force in the opposite direction indicated by the arrows 34 which is induced by the steady current 28. When the pulse of current, indicated by the arrow 29 and the upper curve in FIGURE 9, is passed through the wires 20 and 21, a magnetomotive force indicated by the arrows 35 is generated. This force, combined with the steady force 34 in the sections of the core nearest the conductors 20 and 21 is great enough to form two new domains indicated by the broken arrows 36. The walls of the new domains under the force 34 move to expand the new domains 36 and destroy the domains having the initial magnetization 33. It should be noted that the magnetic influence of the parallel conductors cancels to zero in the plane midway between them which passes through the center of the substrate. As the magnetism in the core is reversed an electromotive force is induced in the substrate 1 surrounded by the core. This E.M.F. is illustrated by 38 in FIGURE 9. This type of switching has the advantage of requiring less stringent uniformity in core characteristics and current and can be effected by a more easily fabricated structure. It is not as fast as systems using rotational switching, however, if the core and substrate diameters are small, sufficient speed can be obtained to serve present day requirements and most of those forecast. In fact the speeds can exceed the capabilities of most electronic circuit elements which are now available. For example, consider the core in which the combined variations in characteristics and magnetomotive forces limit the poorest core in an array to a propagation speed of 2,500 feet per second which is one-half of the maximum speed of 5,000 feet per second and the diameter of the core is 0.001 inch, a practical size. The walls must move a maximum distance equal to one-quarter the circumference of the substrate of 0.00314 inch at a speed of 30,000 inches per second. The switching time is then about 25 nanoseconds.

To fulfill the requirements necessary to produce consistent characteristics in circularly oriented cylindrical cores, in accordance with the invention, the substrate material must have certain properties. First, the substrate must be of substantially non-magnetic material and, for the applications discussed, an electrical conductor. Second, it must be capable of sustaining any heat treatment which may be required in subsequent annealing operations. Third, it must have mechanical properties which will permit it to be elastically deformed during the deposition of the magnetic material or subsequent to such deposition so that the required mechanical strains can be imparted to the magnetic material, and fourth, if annealing operations are required, it must have a coefficient of thermal expansion which in cooperation with that of the magnetic material will, upon cooling, apply the requisite stress to the magnetic material. Even if no heat treatment is to be used, selection of a substrate material must include consideration of its coefficient of thermal expansion so that proper stress conditions are maintained over the expected operating temperature range. Usually this latter expansion requirement can be fulfilled by any material which will satisfy the former.

If the magnetic material used in accordance with this invention has a positive magnetostrictive coefficient such as a nickel iron alloy of 70% nickel and it is to be annealed to a substrate material having a thermal coefficient of expansion, less than that of the core material, will be required. For example, the 70% nickel 30% iron alloy has a thermal coefficient of expansion of about $15\times10^{-6}$ per degree centigrade. This material can be deposited on a non-magnetic alloy wire which has a thermal coefficient of expansion of approximately $12\times10^{-6}$ per degree centigrade. If, after deposition, both the magnetic material and the substrate are subject to an annealing temperature of 800 degrees centigrade for a period of a few seconds or minutes, the nickel iron will be relieved of strains at the high temperatures but upon cooling will shrink at a higher rate than substrate and will be under tension at room temperature. During this operation, some longitudinal tension is maintained in the substrate wire so that when it is cool, the wire tension can be released and the longitudinal stress in the magnetic material decreased and, if necessary, changed to a compressive strain. The difference in the coefficient of thermal expansion between the substrate and the nickel-iron alloy is $3\times10^{-6}$ per degree centigrade. If it is exerted over a temperature range of 800 degrees, the extension of the film is 2.4 parts per thousand. The nickel iron has a Young's modulus of about $2.6\times10^{-7}$ and is so thin that it exerts negligible compressive force on the substrate. Therefore, the tension stress in the film is approximately 62,000 pounds per square inch. Young's modulus for the substrate wire can be low enough, relative to the nickel iron, that elastic control of longitudinal forces can easily be maintained during heat treatment. A sufficiently refractory material can be used for the substrate so its mechanical properties are not seriously affected at the annealing temperature.

If the magnetic material used in accordance with this invention has a negative magnetostriction coefficient such as is found in nickel iron alloy of 85% or more nickel is to be annealed a substrate having a higher coefficient of thermal expansion than that of the magnetic material is used. For example, an alloy having a coefficient of thermal expansion of $18\times10^{-6}$ per degree centigrade is suitable as a substrate. The high nickel iron alloy film has a coefficient of thermal expansion of about $15\times10^{-6}$ per degree centigrade so that the difference is about $3\times10^{-6}$ per degree centigrade. During annealing, the substrate wire is kept under only enough tension to pull it through the furnace. After annealing, the wire is placed under sufficient tension to place the magnetic material in tension along its axis while it is kept in circumferential compression by the higher thermal shrinkage rate of the substrate relative to that of the nickel iron core.

To prepare a wire or tubular substrate for deposition of oriented magnetic material in accordance with this invention, it may first be electro-polished in a bath suitable for the purpose. Such baths are well known in the electrochemical industry usually containing orthophosphoric acid or perchloric acid. This operation may be carried out in apparatus similar to that shown in FIGURE 13 which will be described in connection with the electrodeposition of the thin magnetic films. Electro-polishing may be omitted depending on the initial smoothness of the wire or tubing. Mechanical polishing to eliminate surface grain structure will, however, be required in all but very exceptional cases of particularly well formed wire.

FIGURE 10 shows a mechanism for polishing small diameter wire or tubing in a circumferential direction to produce a surface having as nearly uniform circumferential characteristics as possible in accordance with this invention. It includes a payout spool 40 mounted on the shaft of a tensioning device such as a servo-motor 41 which is supplied with a constant current from a power line, not shown to provide a torque in the direction which will wind the substrate wire on the spool. The wire 1 leaves the spool 40 and passes over and in contact with a grooved wheel or spool 42 which is partially submerged in a solution 43 in which is supsended a polishing compound. The solution is contained in a vessel 44. The spool which may be supported by its buoyancy turns as the wire is pulled over it and carries the polishing solution on its surface to the wire where some of it adheres. After being coated with the polishing compound, the wire passes through the hollow shaft 45 of motor 46 and between two grooved wheels 47 and 48. These wheels are supported by shafts free to turn in a bracket 49 which is clamped to the hollow shaft 45. The grooves in the wheels 47 and 48 lie in a plane which also passes through the center line of the hollow shaft 45. The centers of the wheels are on opposite sides of the center line and displaced from one another in a longitudinal direction. The axis of the wheel 47 nearest the motor is at a distance from the center line of the shaft 45 so that the center line is tangent to the bottom of the groove. The axis of the wheel 48 is slightly less distant from the center line of the shaft than the radius of the circle formed by the bottom of the groove so that the center line of the shaft 45 forms a small cord across the circle formed by the groove. The wire 1 is passed in the grooves of each wheel so that when subject to tension, it presses against each wheel. A spray of water 50 from a nozzle 51 washes the wire to remove the polishing compound after it leaves the polishing wheels 47 and 48. The spray is caught by the funnel 52 and conducted to a drain. A take-up spool 53 driven by a take-up motor 54 draws the wire through the system. As the wire moves, the polishing wheels are rotated around the wire by the motor 46 with the hollow shaft which drives the bracket 49 on which the wheels are supported. The polishing wheels 47 and 48 are made of a plastic material chosen to cooperate with the polishing compound. As the wire moves, the wheels rotate so that there is no longitudinal sliding along the wire. Only slippage around the circumference of the wire occurs with the result that all the polishing action is in circumferential direction. The compound is removed from the wire by the stream of water before the wire is rewound. It should be noted that the polishing wheels spin around the wire at a considerable speed so that in flexing back and forth over the center groove, the wire, leaving wheel 48, vibrates vigorously. This action aids in the removal of the polishing compound and also helps to dry the wire before it reaches the take-up spool 53. The distance between the washing station and the take-up spool is great enough to insure that the substrate wire is dry before it is rewound. It should be mentioned that more polishing wheels can be mounted on the bracket to increase the polishing effect. Also a second polishing motor and wheels can be placed along the wire either before or after the washing point to augment the polishing operation. If a second polishing head is used, its rotation should be opposite that of the first head to provide a counter torque on the wire and thus diminish the twisting effect which would otherwise be increased.

After the substrate has been polished, it is desirable that rings of the stop-off material be applied to it which will prevent the deposit of magnetic material between the places where the magnetic material is to be used as cores. While this operation is not absolutely necessary, it has two advantages. First, it provides finite boundaries for the cores so that when they are subject to externally applied fields whose region of effectiveness may change with current variations, the magnetic material can be confined within the region of effective field, and hence, all of it will always be switched regardless of current fluctuations. The output volt seconds will then always be the same. Second, of less concern, the switching of one core can be completely isolated from influencing a neighboring core on the same substrate.

Figures 11, 12:
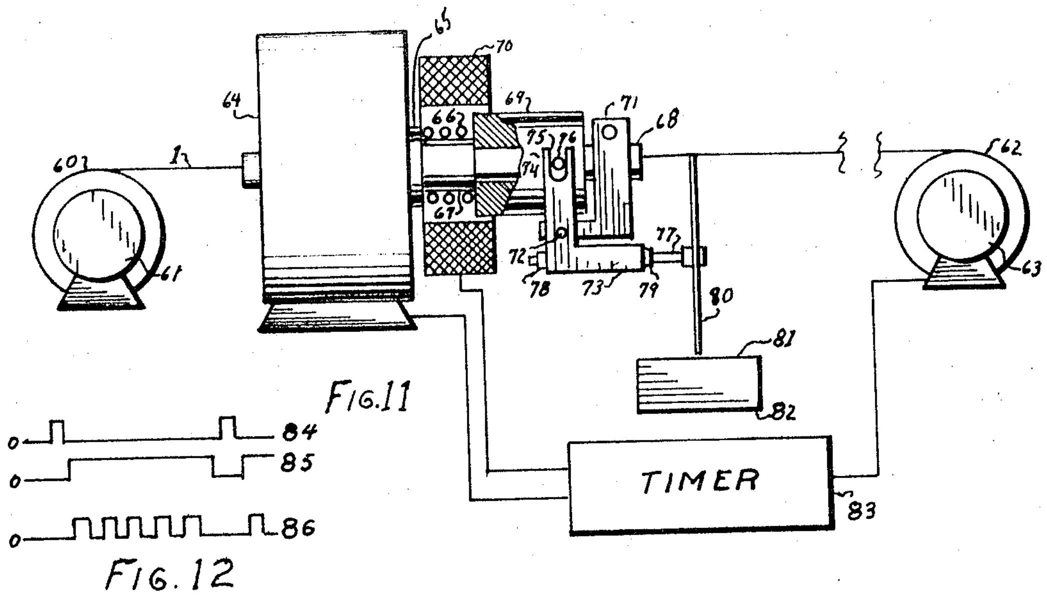
FIGURE 11 shows a mechanism for applying rings of stop off material to provide isolation between cylindrical thin film magnetic memory cores deposited on a common substrate.
FIGURE 12 shows the signals required to operate the mechanism shown in FIGURE 11.

FIGURE 11 shows a mechanism for applying rings of stop-off material at uniform intervals along the substrate. The substrate wire or tubing 1 is wound on a pay out spool 60 mounted on the shaft of a tensioning motor 61 and stretched through the stop-off printing mechanism to a take up spool 62 mounted on the shaft of a stepping motor 63. The printing mechanism has a stepping motor 64 with a hollow shaft through which the wire passes. The shaft has an enlarged section 65 where it emerges from the motor. Against the face of this enlarged section is placed one end of a helical spring 66. The spring encloses a somewhat smaller section on the shaft 67 extending throughout all but a short distance occupied by the spring. Beyond this point the shaft is reduced to a still smaller diameter 68 on which its mounted an iron cylinder 69 which is free to slide on the shaft 68 and is subject to the force of the spring 66 pushing it away from the motor. Around the motor end of the iron cylinder 69 and extending nearly to the face of the motor 63 is a magnet coil 70 which, when energized by suitable electric current, exerts a magnetic force on the iron cylinder or armature 69 causing it to compress the spring 66 to the point where the armature is stopped by the shoulder of the enlarged section of the shaft 67. When no current is flowing in the coil 70, the armature is moved away from the motor by the force of the spring 66 until it is stopped by an L shaped bracket 71 clamped on the end of the shaft 68. The leg of the L shaped fixture extends toward the motor parallel to the shaft 68 and is fitted with a pivot 72 perpendicular to the shaft. On the pivot is mounted a forked member 73 free to swing through a small angle. The tines of the fork 74 extend from the pivot point past either side of the armature. Each tine is provided with a slot 75 which engages a pin 76 that extends from either side of the armature. Motion of the armature thus causes the forked member 73 to rock back and forth about the pivot 72. Below the pivot, the tines of the fork join in a common section which also serves as a bearing for a small shaft 77. This shaft is provided with collars 78 and 79 which keep it from moving longitudinally but it is free to rotate. On the end of the shaft furthest from the motor is mounted a wheel 80 having a rim slightly narrower than the bands of stop-off material to be printed on the wire. The diameter of the wheel 80 is large enough to cause its rim to extend a slight distance beyond the center of the motor shaft 68 so that it deflects the wire 1 when the armature is retracted by the coil.

In this position, the wheel shaft 77 is nearly parallel to the motor shaft. When the armature is released, the wheel is at its lowest excursion and the rim of the wheel is immersed in the stop-off solution 81 contained in the vessel 82. The stop-off solution may be varnish or lacquer or any other material which will solidfy when applied in a thin film and allowed to stand for a short time. If the stop-off material must withstand vacuum treatment or high temperature, it may be made of very finely divided aluminum oxide or other refractory powder suspended in a suitable organic binder. The distance between the print wheel 80 and the take up spool 62 is large enough to permit the material to harden during the operation of the mechanism while a printed section moves from the printing position to the take-up spool. Warm air may be directed at the wire in this space to accelerate the hardening. The stepping motors 63 and 64 and the solenoid 70 are energized by electrical impulses, like those shown in FIGURE 12, generated by the timer 83. The timer 83 is an electronic circuit that may be assembled from commercially available modular pulse generating and sequencing equipment, or from standard electronic components by anyone skilled in the electronic art. In operation, the tensioning motor 60 is energized with a steady current to keep the substrate material stretched through the mechanism. The stepping motor 63 is energized to advance the wire one core space by the timer pulse shown at 84 in FIGURE 12. Next the solenoid 70 is energized to move the printing wheel 80 against the wire 1 and free of the solution 81 by a signal from the timer 83 shown in FIGURE 12 at 85. The stepping motor 64 is energized repeatedly by pulses shown at 86 in FIGURE 12 generated by the timer 83 until it completes exactly one revolution, while the rim of the wheel 80 rolls stop-off material about the circumference of the wire. The solenoid is then de-energized allowing the print wheel to swing away from the wire and to dip again into the stop-off solution 82. The cycle then repeats.

Rings of stop-off material can be applied much more frequently to divide the cores into a number of very short cylinders for the purpose of enhancing orientation. Increased circumferential orientation is produced by this means because the width of the cylinders is too small to support longitudinal magnetic domains.

Figure 13:
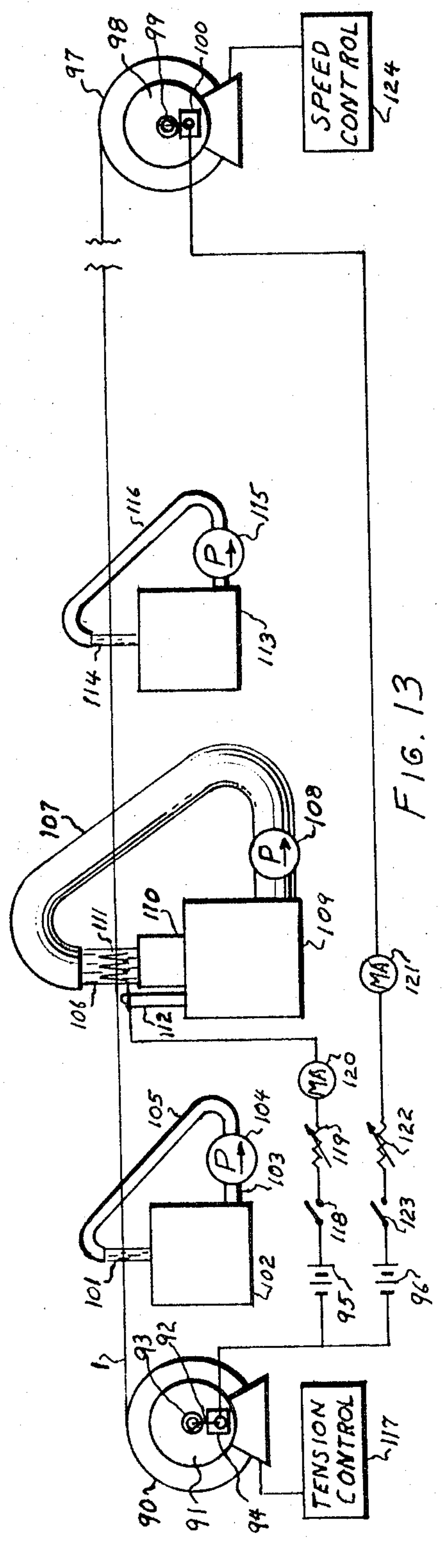
FIGURE 13 illustrates apparatus set up to electroplate thin magnetic films on cylindrical substrates composed of wires, tubing or ribbon in accordance with the invention.

The substrate thus prepared is now ready for the deposition of the magnetic film. This operation may be performed in accordance with the invention by any of the well known techniques such as chemical, electrochemical vapor, epitaxial or gaseous deposition. For purposes of illustration, a continuous electrochemical or plating method is described. The apparatus is shown in FIGURE 13. The substrate wire 1 to be treated is wound on an electrically conducting pay out spool 90 mounted on the conducting shaft of a tensioning motor 91. In this case, the tensioning motor must be a servo motor of the best quality having as nearly friction free bearings as are possible to obtain. Its torque characteristics must be very smooth having no perceptible variations with respect to rotor positions, sometimes called cogwheel effect. It must be energized by well controlled uniform current and carefully calibrated so that the tension it exerts on the wire is uniform and well controlled. At one end of the shaft 93 is a center hole in which a pointed wire contact 92 is pressed by its own spring action. The contact is mounted on a terminal block 94 to which conductors from sources of potential such as batteries 95 and 96 can be connected. The substrate wire 1 extends from the pay-out spool through the deposition apparatus to a conducting take-up spool 97 mounted on the conducting shaft of a take-up motor 98. This shaft is also equipped to receive a pointed contact wire 99 mounted on a terminal block 100. The take-up motor must be capable of operating at a very uniform speed. It is desirable that this speed be adjustable. Such adjustment can be provided by a standard voltage control device 124 as, for example, a variable autotransformer or controlled rectifier circuit. However, a synchronous motor geared or belted to drive the spool mounting shaft at the required speed can be used. The take-up spool and all subsequent spools on which the substrate wire with the deposited magnetic material is wound must be large enough in diameter to keep the bending stresses in the magnetic material to magnitudes which are relatively very small compared to those purposely exerted to enhance orientation. As the wire leaves the pay-out spool, it first passes through a stream of cleaning or surface treating solution 101. The solution is pumped from a vessel 101 through an outlet 103 by the pump 104 through a tube 105 from which it discharges. The solution may be a dilute nitric or other acid cleaning agent, a complex wetting solution or distilled water, depending on the requirements of the surface. After passing through the cleaning spray, it may also pass through other similar sprays, not shown, for removing the cleaner. It then passes through a stream of alloy plating solution 106 delivered from the tube 107 by the pump 108 whose intake is connected to an outlet from the vessel 109. The composition of this solution will depend on the kind of magnetic material being deposited. For example, to deposit a nickel iron alloy having about 72% nickel to provide a positive magnetostriction coefficient, the following bath may be used.

| Chemical | Formula | Quantity, grams/liter |
|---|---|---|
| Nickel sulphate | $N_1SO_46H_2O$ | 218.00 |
| Ferrous sulfate | $FeSO_47H_2O$ | 12.00 |
| Sodium chloride | NaCl | 9.70 |
| Boric acid | $H_3BO_3$ | 25.00 |
| Saccharin | $C_6H_4SO_2NHCO$ | 0.83 |
| Triton CF-21 | (1) | 1.30 |

[1] (Proprietary wetting agent) Trademark of Rhone and Haas Co., Phila., Pa.

An alloy having a composition of approximately 86 percent nickel and 14 percent iron and having a negative coefficient of magnetostriction can be produced by modifying the composition of this bath by reducing the quantity of ferrous sulfate to three and one-half grams.

The vessel 109 is made to completely enclose the solution except near the top of a column 110 in which the discharge 106 is received. This enclosure reduces the ffect of air on the solution which otherwise may oxidize one or more of its components. In the descending stream of solution 106 is placed a helix of wire 111 of material which can serve as the anode of the electroplating bath. In the example cited, a suitable material is either a nickel or platinum wire. The helical structure is used to permit the free vertical passage of the solution with a minimum of disruption or splashing and at the same time present a symmetrical field to the substrate wire which passes through its center. The flow of the solution is adjusted to maintain a uniform smooth sided stream. The anode is supported by an extension of the helix wire to a terminal post 112 mounted on the cover of the vessel 109. After passing through the plating bath, the wire is drawn through a washing bath constructed like the cleaning bath. It has a vessel 113 from which a stream of distilled water 114 forced by the pump 15 through the tube 116 to wash the residue of the plating bath from the wire. Sufficient space and, if desired, a draft of warm air is provided between the washing bath and the take-up spool to permit the cores and the substrate to dry before being wound. The dimensions of the various vessels along the path of the wire are kept as small as practicable so that cleaning and plating solutions do not have time to dry between stations when the system is operating. When the apparatus is set up and the solutions are in the vessels, the wire is stretched from the pay-out spool to which it makes electrical contact, through the helical anode over the plating bath and is then fastened to the take-up spool in a way that makes electrical contact. The pay-out motor is energized and tension in the wire adjusted by adjusting the supply current with a suitable control 117 which may be a rheostat or adjustable autotransformer. The take-up motor is next started. Its speed has been determined by the thickness of the plating required to form the cores, the efficiency of the plating bath and the plating current. The plating current is next turned on by closing the switch 118 and adjusted to provide a plating current density of about 6 milliamperes per square centimeter in the solution described with the rheostat 119. It is monitored by the meter 120. The source of the current is the battery 95. The current path is through the contact to the pay-out motor shaft through the pay-out spool 90 along the substrate wire, through the plating solution in the stream 106 to the anode 111 and thence to the meter 120. A second orienting current path may be provided through the wire 1 past the anode to the take-up spool 97 and its shaft and contact 99 thence through the meter 121, theostat 122, and closed switch 123 and battery 96. This current generates a magnetic field around the wire which causes initial circumferential orientation of the magnetic material as it is deposited. In most cases, this orienting field is not required in the manufacturing process which is here described. Under certain circumstances when the magnetic material has a very low magnetostriction coefficient such a field may be beneficial. As the substrate wire is wound on the take-up spool, the strain on the substrate wire from the tension provided by the pay-out motor will be present. If the magnetic material has positive magnetostriction, as it would in the example presented, this strain will be quite large so that when it is permitted to relax upon installation in a memory, the magnetic films are compressed in the longitudinal direction. Compression strains cause positive magnetostrictive material to orient in a direction perpendicular to the strain. Thus circumferential orientation is produced.

Figure 14:
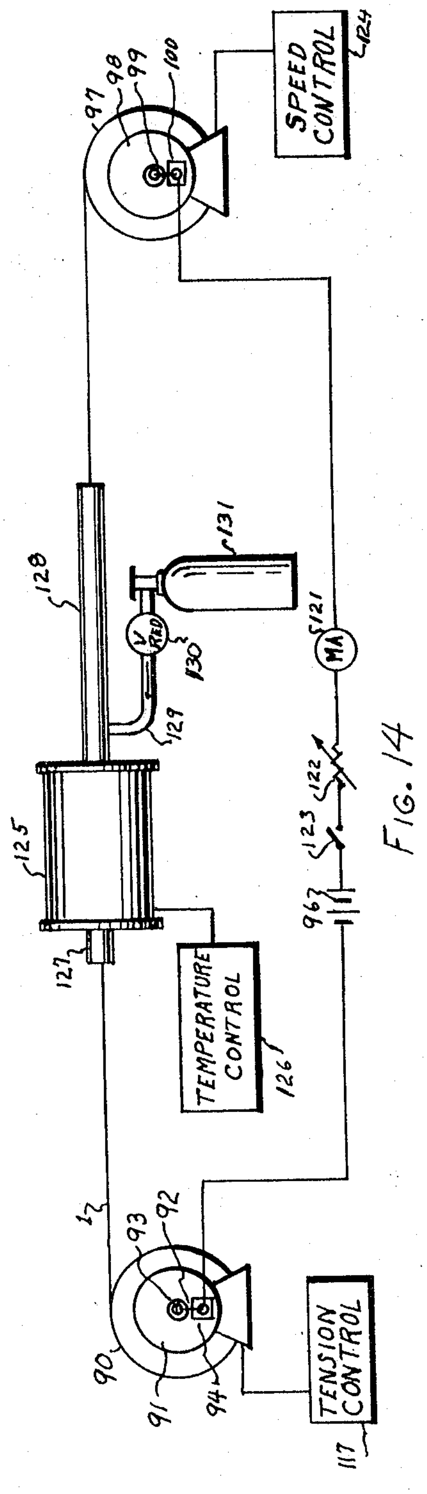
FIGURE 14 shows an annealing furnace and associated equipment for heat treating thin magnetic films on long continuous substrates in accordance with the principles of the invention.

If the magnetic material as plated exhibits greater coercivity than is desired, the plated substrate can be passed through an annealing furnace as shown in FIGURE 14. This operation is arranged to establish the strains necessary to provide the required orientation in accordance with the invention. The apparatus includes the same type of pay-out and take-up mechanism and orienting field current supply as those shown in FIGURE 13 and identiwith the same numbers. Both spools are large enough in diameter to prevent appreciable bending stresses from being exerted on the magnetic core material. The wire 1 with the plated cores in stretching from the pay-out spool 90 to the take-up spool 97 passes through a furnace 125 provided with a temperature controller 126. The furnace muffle 127 has an extension 128 equal in length to that of the muffle and extending toward the take-up spool 97. At the point where the muffle extension 128 joins the muffle 127 is a side tube 129 which connects to a pressure reducing valve 130 which controls the flow of an inert gas such as dry helium or a reducing gas such as dry hydrogen from storage tank 131 to the muffle. This arrangement provides a controlled atmosphere within the furnace which displaces air from the system and prevents oxidation of the magnetic material during annealing. The muffle extension 128 preserves the atmospher around the cores leaving the furnace and protects them from oxidation during cooling. During operation a constant temperature is maintained in the furnace and the wire drawn through by the take-up motor at a speed which provides the annealing time required. In the example which has been discussed in which the magnetic material is an alloy of 72 percent nickel and 28 percent iron, an annealing temperature of approximately 800 degrees centigrade and a period of about 4 seconds is satisfactory. The tension in the substrate during this operation is less than that during plating because the strength of the material is less at this elevated temperature than at room temperature. It may be further reduced if the final strain condition to be produced in the core is to be derived from differences in the coefficients of thermal expansion. If very low tensions are required to accommodate cores of material having negative magnetostriction coefficients, it may be necessary to orient the apparatus so that the wire is passed through the furnace vertically to prevent sagging of the wire which would cause it to drag over the inner surface of the furnace muffle and sustain scratches.

In the foregoing discussion, the substrate was generally described as a wire or a tube. Other shapes such as ribbons or even channel-shaped substrates, which provide cores having open magnetic paths, may be used. Longitudinal and even helical orientations can also be provided by these methods by suitable polishing techniques, stressing, and by well known combinations of magnetic orienting fields.

The plating mechanism and the annealing apparatus can be modified too so that either vacuum vapor deposition or vacuum annealing or both may be accomplished.

This specification has described the properties of films of magnetic materials which are useful in orienting these materials for their application in making memory cores. In accordance with the invention, it has described magnetostrictive cores which incorporate strains to produce or enhance orientation. It has also described, in accordance with the invention, cores deposited on substrates whose surface is amorphous and is formed to provide uniform cross sections of cores along the direction of their orientation and thus provide or enhance orientation. Discussion of well known magnetic techniques for orienting thin magnetic films have also been presented along with a description of a practical way of establishing boundaries for cylindrical cores and for sub-dividing cores to further enhance orientation. Methods of switching cylindrical cores have been touched upon. Also in accordance with the invention, methods for continuously treating substrate materials and depositing cores in large quantities along with suitable apparatus for implementing these methods have also been described.

What I claim is:

1. A memory code having uniaxial anisotropy comprised of a film of magnetic material and a substrate upon which the magnetic material is deposited, the surface of said substrate upon which the magnetic material is deposited being so finished that the residual imperfections are in the form of elongated deformations, parallel to the direction of orientation.

2. A method of inducing magnetic orientation in a memory core oriented in a predetermined direction comprised of a film of magnetic material having a predetermined coefficient of magnetostriction and a substrate upon which the magnetic material is deposited, the material of said substrate to have a coefficient of thermal expansion of one value, the magnetic material to have a coefficient of thermal expansion of another value, said orientation to be induced by establishing a strain in the magnetic material in such a direction as to provide orientation in the required direction by heating the core including the magnetic material and the substrate to a temperature high enough to cause strain relief to occur in the magnetic material, allowing the core to remain at the annealing temperature until reduction in stress between the two materials has occurred, then cooling to the operating temperature at which the differential shrinkage between the two materials establishes strains in the magnetic material which are in the direction and have the magnitude to produce the required orientation.

3. A method of inducing orientation in a memory core comprised of a film of magnetic material having a predetermined coefficient of magnetostriction and an elastic substrate upon which the magnetic material is deposited, said magnetic material having a coefficient of thermal expansion of a first value, said substrate having a coefficient of thermal expansion of a second value, said magnetic material and substrate being raised to the annealing temperature of the magnetic material, annealing being carried out with substrate subject to a first value of stress, said first value of stress maintained in the substrate as substrate and magnetic material cool to room temperature, substrate being subject to stress of a second value when core is placed in service.

4. A method of inducing uniaxial anisotropy in a memory core comprised of a film of magnetic material deposited on the surface of a substrate, said substrate prepared by mechanical polishing in such a way that material forming surface has been displaced from the parent material to form a surface with substantially all residual discontinunities in said surface after polishing elongated in the direction of the orientation.

5. A circumferentially oriented cylindrical memory core comprised of a film of magnetic material having a positive coefficient of magnetostriction deposited on a cylindrical substrate having a coefficient of thermal expansion substantially smaller than the coefficient of thermal expansion of the magnetic material, said magnetic material subject to thermally induced circumferential tensile stresses.

6. Device as defined in claim 5 wherein axial compressive stresses are imposed on the magnetic material by elastic forces in said substrate.

7. A method of inducing orientation in a circumferentially oriented cylindrical memory core composed of a film of magnetic material having a positive coefficient of magnetostriction deposited on a cylindrical elastic substrate having a coefficient of thermal expansion substantially smaller than the coefficient of thermal expansion of the magnetic material by providing a compressive strain in the magnetic material parallel to the axis of the cylinder and a tensile strain in the circumferential direction by subjecting the deposited magnetic material and substrate to a temperature sufficiently high to relieve strains in the magnetic material while the substrate is subject to relatively high tensile stress that is maintained until the end of a subsequent cooling period and then relaxed to a much lower strain, said tensile strain in the magnetic material being produced by the differential thermal contraction of the substrate and magnetic material, said compressive strains produced by the elastic contraction of the relieved substrate.

8. A circumferentially oriented cylindrical memory core comprised of a film of annealed magnetic material having a negative coefficient of magnetostriction deposited on an elastic cylindrical substrate having a coefficient of thermal expansion substantially larger than the coefficient of thermal expansion of the magnetic film, said magnetic material having circumferential compressive strains.

9. A method of inducing circumferential orientation in a cylindrical memory core comprised of a film of magnetic material having a negative coefficient of magnetostriction deposited on an elastic cylindrical substrate which has a coefficient of thermal expansion substantially greater than the coefficient of thermal expansion of the magnetic material by providing a circumferential compressive strain and an axial tensile strain in the magnetic material by heating the magnetic material and the substrate to a sufficiently high temperature to relieve strains in the magnetic material then cooling them to the operating temperature, keeping the substrate substantially free of axial stress, after cooling establishing and maintaining axial tensile stress on the substrate to produce strains which exert stress on the magnetic material by shear forces between the substrate and magnetic material to provide axial strain in the magnetic material, compressive strain in the magnetic material is exerted by the differential thermal shrinkage during cooling.

10. Magnetic memory cores each comprised of a plurality of films of magnetic material deposited on a cylindrical substrate, said films having the form of short cylinders of substantially uniform cross section separated from one another by spaces having axial dimensions of the same order of magnitude as that of the length of the cylinders, the axial length of said cylindrical films being insufficient for the magnetic material to sustain a magnetic domain polarized in the axial direction.

11. A memory core comprising a film of annealed ferromagnetic material supported on a substrate composed of nonmagnetic material said substrate having a coefficient of thermal expansion whose ratio with respect to that of said magnetic material is selected to produce a substantially constant predetermined strain in said magnetic material over the range of temperatures encountered in operation.

12. A memory core as defined in claim 11 wherein the substrate is cylindrical and the magnetic material is under circumferential strain.

References Cited

UNITED STATES PATENTS

| | | | |
|---|---|---|---|
| 3,317,742 | 5/1967 | Guerth | 307—88 |
| 3,221,312 | 11/1965 | MacLachlan | 340—174 |
| 3,217,301 | 9/1965 | Shook | 340—174 |

JAMES W. MOFFITT, Primary Examiner.